United States Patent
Hoech et al.

(10) Patent No.: US 7,929,458 B1
(45) Date of Patent: Apr. 19, 2011

(54) ORGANIZATIONAL AND CONTROL MECHANISM FOR SPECTRALLY-EFFICIENT MANAGEMENT OF DYNAMIC SOCKET WAVEFORMS

(75) Inventors: Karl F. Hoech, Cedar Rapids, IA (US); Robert J. Frank, Cedar Rapids, IA (US); Bruce S. Kloster, Cedar Rapids, IA (US); Gunther B. Frank, Robins, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1487 days.

(21) Appl. No.: 11/338,307

(22) Filed: Jan. 24, 2006

(51) Int. Cl.
*H04L 1/00* (2006.01)
*H04L 12/28* (2006.01)

(52) U.S. Cl. ........................ 370/254; 370/252
(58) Field of Classification Search .................. 370/252, 370/254
See application file for complete search history.

(56) References Cited

U.S. PATENT DOCUMENTS

| | | | |
|---|---|---|---|
| 2004/0264403 A1* | 12/2004 | Fette et al. | 370/328 |
| 2005/0096065 A1* | 5/2005 | Fleischman | 455/456.1 |
| 2005/0213516 A1* | 9/2005 | Ramirez et al. | 370/254 |
| 2006/0233191 A1* | 10/2006 | Pirzada et al. | 370/463 |
| 2006/0239458 A1* | 10/2006 | Bicksler et al. | 380/221 |
| 2007/0021954 A1* | 1/2007 | El-Damhougy | 703/21 |

* cited by examiner

*Primary Examiner* — Ricky Ngo
*Assistant Examiner* — Paul Masur
(74) *Attorney, Agent, or Firm* — Matthew J. Evans; Daniel M. Barbieri

(57) ABSTRACT

The present invention provides a method for using an Organization and Control Proxy (OCP) to configure a network communications infrastructure. OCP functionality is distributed across nodes possessing OCP elements. Intercommunication between the OCP elements is implemented via a unifying mesh waveform for network discovery, propagation of network and radio-frequency (RF) socket usage information, and management and control of instances of dynamic socket waveforms. An extensible language for specification of waveform properties is used by the OCP elements to negotiate spectral use information and to negotiate configurations between two or more endpoints of a dynamic socket waveform connection. A network stack is configured by the OCP to provide requested service to an end user.

15 Claims, 4 Drawing Sheets

ORGANIZATIONAL AND CONTROL MECHANISM FOR SPECTRALLY-EFFICIENT MANAGEMENT OF DYNAMIC SOCKET WAVEFORMS

CROSS-REFERENCE TO RELATED DOCUMENTS

The present application herein incorporates United States Patent Application with "Express Mail" Mailing Label No. EV 793380400 US, now issued U.S. Pat. No. 7,733,839, entitled: "Dynamic Socket Waveform" and issued on Jun. 8, 2010 by reference in its entirety.

FIELD OF THE INVENTION

The present invention generally relates to communications, and particularly to organizational and control mechanism for spectrally-efficient management of dynamic socket waveforms.

BACKGROUND OF THE INVENTION

Software Defined Radios (SDRs) methodology is rapidly gaining favor as a way to architect and design radio communication systems with greatly improved interoperability and ability to accommodate future waveform variants. SDR refers to wireless communication in which the transmitter modulation is generated or defined by a computer, and the receiver uses a computer to recover the signal intelligence. To select the desired modulation type, the proper programs are run by microcomputers that control the transmitter and receiver. A typical voice SDR transmitter, such as may be used in mobile two-way radio or cellular telephone communication, include the following stages, where items followed by asterisks represent computer-controlled circuits whose parameters are determined by the programming (software): (1) Microphone; (2) Audio amplifier; (3) Analog-to-digital converter (ADC) that converts the voice audio to digital data*; (4) Modulator that impresses the digital intelligence onto a radio-frequency (RF) carrier*; (5) Series of amplifiers that boosts the RF carrier to the power level necessary for transmission; and (6) Transmitting antenna. A typical receiver designed to intercept the above-described voice SDR signal may employ the following stages, essentially reversing the transmitter's action, where items followed by asterisks represent programmable circuits: (1) Receiving antenna; (2) Superheterodyne system that boosts incoming RF signal strength and converts it to a lower frequency; (3) Demodulator that separates the digital intelligence from the RF carrier*; (4) Digital-to-analog converter (DAC) that generates a voice waveform from the digital data*; (5) Audio amplifier; and (6) Speaker, earphone, and/or headset. The most significant asset of SDR is versatility. Wireless systems employ protocols that vary from one service to another. Even in the same type of service, for example, cellular telephones, the protocol often differs from country to country. A single SDR set with an all-inclusive software repertoire may be used in any mode, anywhere in the world. Changing the service type, the mode, and/or the modulation protocol involves simply selecting and executing the requisite computer program. The ultimate goal of SDR engineers is to provide a single radio transceiver capable of playing the roles of cordless telephone, cell phone, wireless fax, wireless e-mail system, pager, wireless videoconferencing unit, wireless Web browser, Global Positioning System (GPS) unit, and other functions still in the realm of science fiction, operable from any location on the surface of the earth, and perhaps in space as well.

With a growing demand for wireless applications and the fixed RF spectrum, research programs such as Defense Advanced Research Projects Agency (DARPA)'s next Generation (XG) are examining the possibility of re-application of spectral resources in an ad hoc manner by sensing current usage and temporarily claiming unused portions of the RF spectrum. To date, programs have proposed or demonstrated a limited set of waveforms for application on XG. However, with the emergence of SDRs, the possibility exists not only for detection of spectral re-use opportunities and filling with a fixed or parameterized waveform such as Orthogonal Frequency Division Multiplexing (OFDM) or the like, but also for selection of more comprehensive waveform characteristics such as modulation, channel coding, and TRANsmission SECurity (TRANSEC) algorithms.

Quint Networking Technology (QNT) is a DARPA-led technology program to produce a very small and modular digital communications system for a variety of ground and airborne applications. QNT may be used by dismounted air controllers and incorporated into weapons and small unmanned air vehicles (UAVs) so that these platforms may network with tactical aircraft and unmanned combat air vehicles (UCAVs) in order to better synchronize airborne and ground activities, as well as provide enhanced targeting information. The program may combine hardware miniaturization and special software to enable ad hoc bandwidth allocation to meet the dynamic demands of combat operations. The program may be targeting connectivity between dismounted soldiers, small UAVs, tactical UAVs, weapons, and manned aircraft. Low power, small size, link robustness, high throughput, low latency, mobility and ad-hoc connectivity are driving requirements for the QNT system. QNT may bring historically disadvantaged users and platforms into the Global Information Grid (GIG) as active participants and extends new levels of capability to disposable low cost radios.

One key to QNT success is to maintain highly dynamic ad hoc operation such as is accomplished with Tactical Targeting Network Technology (TTNT)/TTNT SFF (Small Form Factor) while operating for long periods of time in a low power, small form factor, battery powered device over significant distances. However, it has not been provided such a means for selection of waveform properties and parameters, which may optimally utilize the vacant portions of the spectrum in terms of their RF propagation characteristics. Further, no work has been done with respect to application of these waveforms under current spectral allocations such as Department of Defense Form 1494 (DD 1494) or the like.

Thus, it is desirable to provide a capability for examination of the vacant spectrum and selection of waveforms with characteristics which may optimally utilize the available RF characteristics while matching the demanded classes of service.

SUMMARY OF THE INVENTION

In an exemplary aspect of the present invention, a method for using an Organization and Control Proxy (OCP) to configure a network communications infrastructure is provided. OCP functionality is distributed across nodes possessing OCP elements. Intercommunication between the OCP elements is implemented via a unifying mesh waveform for network discovery, propagation of network and radio-frequency (RF) socket usage information, and management and control of instances of dynamic socket waveforms. An extensible language for specification of waveform properties is used by the OCP elements to negotiate spectral use information and to negotiate configurations between two or more endpoints of a dynamic socket waveform connection. A network stack is configured by the OCP to provide requested service to an end user.

In an additional exemplary aspect of the present invention, it is provided a method for an Organization and Control Proxy (OCP) to enable configuration of a dynamic socket waveform for a User Datagram Protocol (UDP)/Internet Protocol (IP)-based database server application. An OCP element on a server node negotiates with other OCP elements within an area of service of the database server application. A dynamic socket waveform and a network stack are set up for the database server application. The OCP element selects parameters for the dynamic socket waveform supported by an underlying dynamic socket waveform implementation.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1:
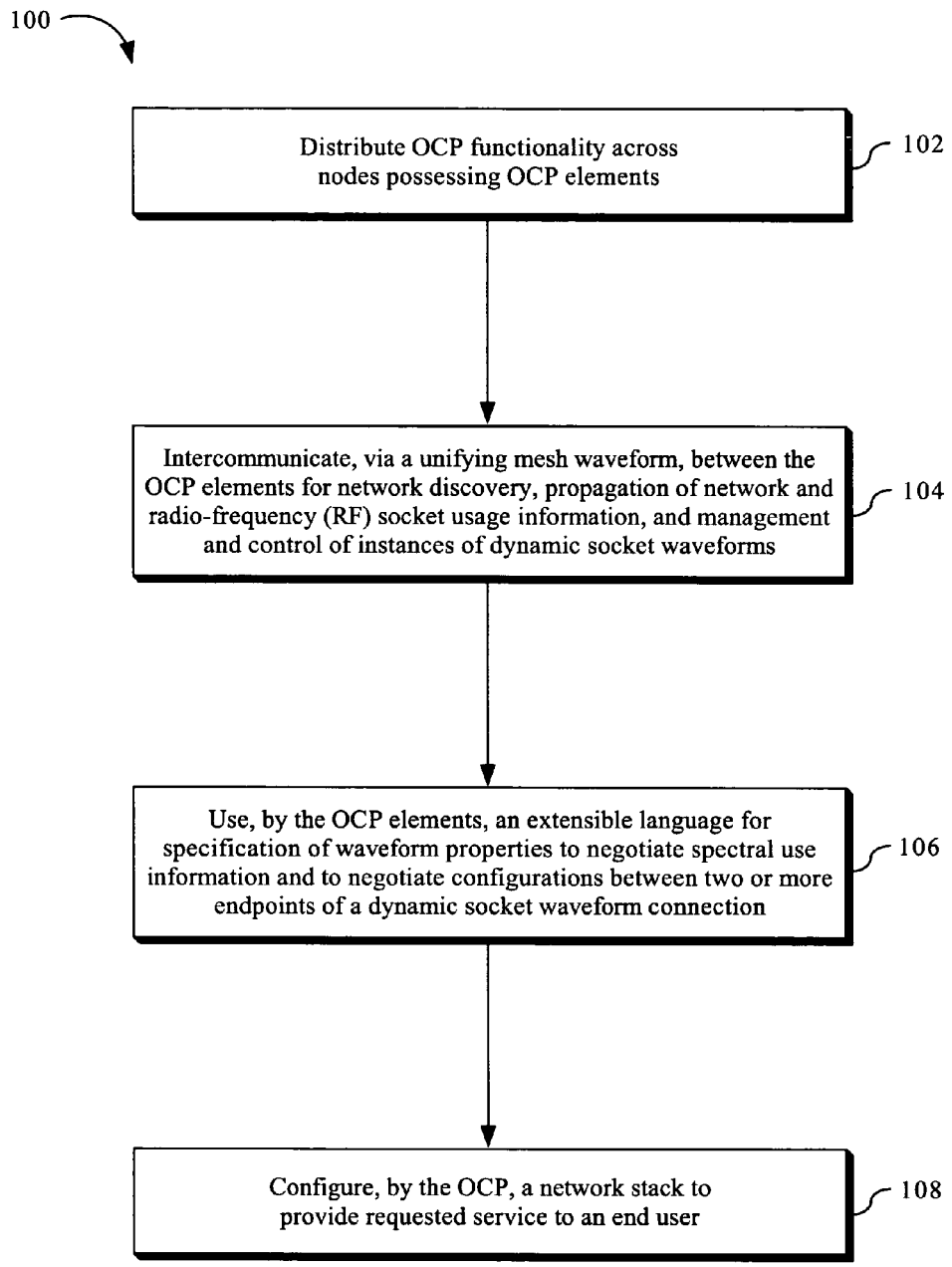
FIG. 1 is a flowchart of a method for using an Organization and Control Proxy (OCP) to configure a network communications infrastructure in accordance with an exemplary embodiment of the present invention.

Reference will now be made in detail to the presently preferred embodiments of the invention, examples of which are illustrated in the accompanying drawings.

The United States Patent Application with "Express Mail" Mailing Label No. EV 793380400 US, now issued U.S. Pat. No. 7,733,839, entitled: "Dynamic Socket Waveform" and issued on Jun. 8, 2010 discloses the dynamic socket waveform concept, through which the QNT solution may leverage the TTNT ad-hoc behavior and extend it to the UHF (Ultra High Frequency)/VHF (Very High Frequency) bands. A socket is a form of inter-process communication used to form one end of a bi-directional communication link between two applications over a computer network. A socket often gets bound to a given port, which lets the transport layer protocol such as User Datagram Protocol (UDP), Transmission Control Protocol (TCP), or the like identify which application to send the data to. The dynamic socket waveform is a dynamically configurable RF socket central to the construction of networks meeting the modern challenge. The dynamic socket waveform extends the notion of a network socket from the Open Systems Interconnection (OSI) transport layer through network, media access, logical link control, and physical layers.

According to the OSI standard, physical layers are connected to the network at respective hosts, the physical layers providing transmission and receipt of raw data bits via the network. A data link layer is serviced by the physical layer of each host, the data link layers providing frame division and error correction to the data received from the physical layers, as well as processing acknowledgment frames sent by the receiving host. A network layer of each host is serviced by respective data link layers, the network layers primarily controlling size and coordination of subnets of packets of data.

A transport layer is serviced by each network layer and a session layer is serviced by each transport layer within each host. Transport layers accept data from their respective session layers and split the data into smaller units for transmission to the other host's transport layer, which concatenates the data for presentation to respective presentation layers. Session layers allow for enhanced communication control between the hosts. Presentation layers are serviced by their respective session layers, the presentation layers translating between data semantics and syntax which may be peculiar to each host and standardized structures of data representation. Compression and/or encryption of data may also be accomplished at the presentation level. Application layers are serviced by respective presentation layers, the application layers translating between programs particular to individual hosts and standardized programs for presentation to either an application or an end user. The Transmission Control Protocol/Internet Protocol (TCP/IP) standard includes the lower four layers and application layers, but integrates the functions of session layers and presentation layers into adjacent layers. Generally speaking, application, presentation and session layers are defined as upper layers, while transport, network and data link layers are defined as lower layers.

The rules and conventions for each layer are called the protocol of that layer, and since the protocols and general functions of each layer are roughly equivalent in various hosts, it is useful to think of communication occurring directly between identical layers of different hosts, even though these peer layers do not directly communicate without information transferring sequentially through each layer below. Each lower layer performs a service for the layer immediately above it to help with processing the communicated information. Each layer saves the information for processing and service to the next layer. Due to the multiplicity of hardware and software architectures, devices and programs commonly employed, each layer is necessary to insure that the data can make it to the intended destination in the appropriate form, regardless of variations in hardware and software that may intervene.

In preparing data for transmission from a first host to a second host, some control data is added at each layer of the first host regarding the protocol of that layer, the control data being indistinguishable from the original (payload) data for all lower layers of that host. Thus an application layer attaches an application header to the payload data and sends the combined data to the presentation layer of the sending host, which receives the combined data, operates on it and adds a presentation header to the data, resulting in another combined data packet. The data resulting from combination of payload data, application header and presentation header is then passed to the session layer, which performs required operations including attaching a session header to the data and presenting the resulting combination of data to the transport layer. This process continues as the information moves to lower layers, with a transport header, network header and data link header and trailer attached to the data at each of those layers, with each step typically including data moving and copying, before sending the data as bit packets over the network to the second host.

The receiving host generally performs the converse of the above-described process, beginning with receiving the bits from the network, as headers are removed and data processed in order from the lowest (physical) layer to the highest (application) layer before transmission to a destination of the receiving host. Each layer of the receiving host recognizes and manipulates only the headers associated with that layer, since to that layer the higher layer control data is included with and indistinguishable from the payload data. Multiple interrupts, valuable central processing unit (CPU) processing time and repeated data copies may also be necessary for the receiving host to place the data in an appropriate form at its intended destination.

While the traditional socket application programmer interface (APT) contains parameters to select transport and network protocols, the dynamic socket waveform adds parameters describing point-to-point and multi-point communications protocols, media access modes, TRANSEC characteristics and Signal In Space (SIS) parameters. Via this means, special purpose data links may be constructed and torn down in an ad hoc and dynamic manner. The dynamic socket waveform forms a means for flexibly configuring a SDR in a common manner.

The dynamic socket waveform approach may have the following advantages. First, it may increase user capacity of a system such as TTNT by an order of magnitude or more by allowing for coordinated spectral sharing and by adding to the system bandwidth. Additionally, it may enable low latency real time optimization of bandwidth utilization, latency, user connectivity, connectivity topology, and the like. Moreover, it may operate with no addressing or messaging overhead so that the communications link bandwidth may be retained for data. Further, it may allow extension of ad hoc responsiveness of links such as TTNT to bands such as UHF or VHF to take advantage of excellent propagation and computational simplicity, which allows for power/computation efficient communications techniques.

Dynamic socket waveforms may take advantage of significant spectral allocation. The low band sockets may operate with carrier frequencies from 30 MHz to 1 GHz and have bandwidths available for use from 25 kHz, 50 kHz, 1.2 MHz, to ~5 MHz. Sockets may also be created at high carrier frequencies or with directional links.

However, it has not been provided such a means for selection of waveform properties and parameters, which may optimally utilize the vacant portions of the spectrum in terms of their RF propagation characteristics. Further, no work has been done with respect to application of these waveforms under current spectral allocations such as Department of Defense Form 1494 (DD 1494) or the like. What is needed to fill this gap is a capability for examination of the vacant spectrum and selection of waveforms with characteristics which may optimally utilize the available RF characteristics while matching the demanded classes of service.

In one aspect, the present invention discloses a concept of an Organization and Control Proxy (OCP) for distributed, dynamic management and optimization of RF spectral resources. Through application of the OCP, the capabilities of the dynamic socket waveform may be managed and optimized. The OCP is a cross-layer management and control process whereby elements of the network stack are selected and configured to provide the end user with the best possible communications infrastructure. As such, it, based upon user requested quality of service needs, may configure the network stack and underlying dynamic socket waveform to provide user applications the requested service. A network stack is a protocol stack of protocols used in network communications such as TCP/IP, Transport Layer Security/Secure Sockets Layer (TLS/SSL), those included in the OSI model, and other similar protocols.

The OCP may provide a means of automated selection, management and optimization of dynamic socket waveforms and legacy waveform selections, while providing the user a means of requesting communication based upon a set of class of service parameters. The OCP approach and the dynamic socket waveform approach together may enable as much as 100 times increase in the capacity of presently congested and inefficiently-used RF spectral resources.

The present OCP approach may include the following characteristics: (1) management of an ad hoc communications architecture from user application to user application encompassing physical, media access, network and transport layers (and potentially session and presentation layers in a full OSI reference architecture); (2) a cross-layer functionality configuring the network communications infrastructure; (3) continuous re-optimization of communications infrastructure even while communications are in progress; (4) extending the notion of socketed interfaces from physical to presentation layers; (5) enabling increases in performance and efficiency of the communications-enabled applications by tailoring the network infrastructure for each application; and (6) use of a unifying mesh subnetwork (e.g., QNT's TTNT-SFF) to provide a channel for management traffic.

Referring now to FIG. 1, a method 100 for using an OCP to configure a network communications infrastructure in accordance with an exemplary embodiment of the present invention is shown. OCP functionality may be distributed across nodes possessing OCP elements 102. Intercommunication between the OCP elements is implemented via a self-configuring waveform (referred as a unifying mesh waveform) for network discovery, propagation of network and RF socket usage information, and management and control of instances of dynamic socket waveforms 104. While any self-organizing waveform such as Wideband Networking Waveform (WNW) may be used as the OCP unifying mesh waveform, performance may be enhanced by use of a waveform with rapid ingress capabilities and immediate channel access such as the TTNT waveform or the like. Additionally, since one of the primary roles of the OCP is to manage dynamic socket waveform connectivity on small form factor platforms, use of TTNT SFF may be preferred.

An extensible language for specification of waveform properties, carried by a light-weight transport protocol, may be used by the OCP elements to negotiate spectral use information and to negotiate configurations between two or more endpoints of a dynamic socket waveform connection 106.

Figure 2:
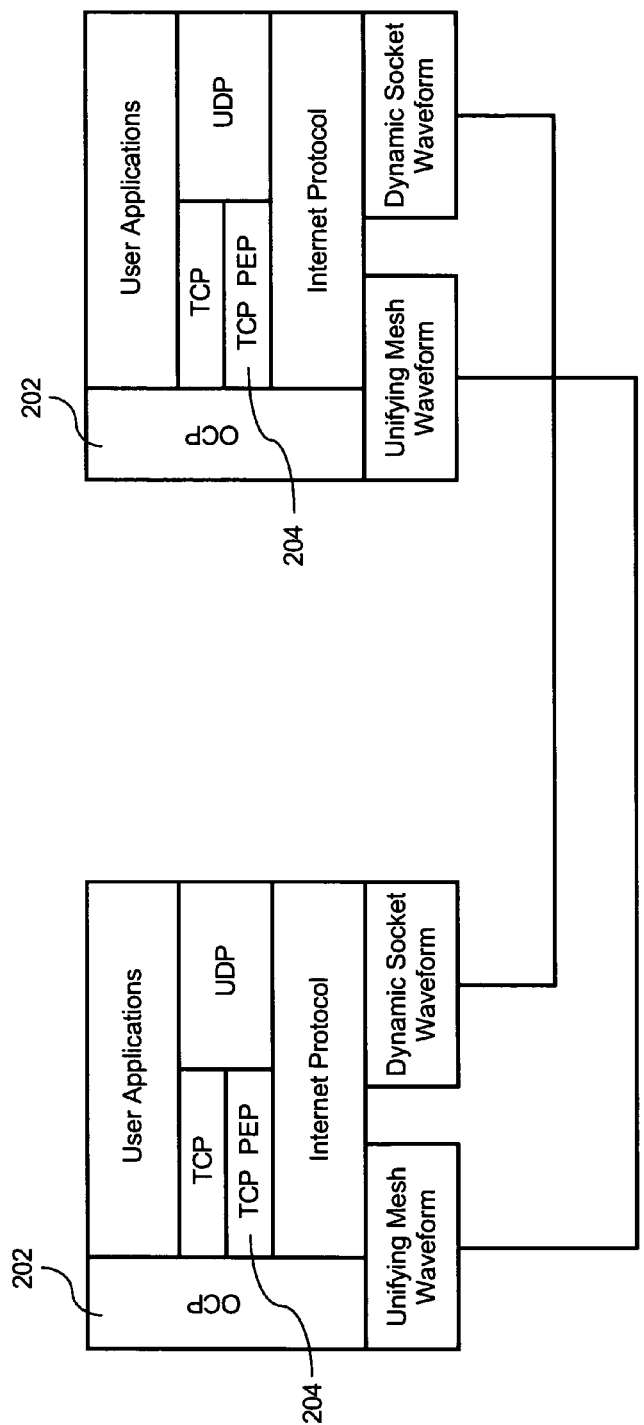
FIG. 2 is a schematic diagram illustrating that OCP modifies the structure of a network stack to insert TCP PEP (performance enhancing proxy) in accordance with an exemplary embodiment of the present invention.

A network stack may be configured by the OCP to provide requested service to an end user 108. The OCP may manage the entire chain of connectivity between instances of an application on two or more nodes. The OCP may configure ad hoc and per-application basic network stacks to implement communications. Network stacks may be configured with respect to the OSI reference network architecture or in a simplified architecture built to facilitate the needs of the application at hand. The stack may be configured as a chain of protocol elements built up from the media access and physical layers and potentially including sub-networking protocols, inter-networking, transport, session and presentation protocols. Further, specialized shims or proxies may be inserted as desired. For example, FIG. 2 shows the Internet stack configured via the OCP to include a performance enhancing proxy (PEP) to resolve the issues with using TCP over wireless networks. As shown, the OCP 202 modifies the structure of the network stack to insert TCP PEP 204.

The OCP may use one of a variety of communications capabilities to implement the waveform properties requested by applications, including legacy networks, dynamic socket waveform connections, and the OCP unifying mesh waveform itself.

Each element of the OCP maintains a model view of the RF bands in which it is allowed to operate. Usage allocations corresponding to existing dynamic socket waveform connections within these bands may be expressed as a tuple including the frequency coverage, multiple access scheme, modulation, and power and geographic coverage in terms of link closure and interference. The OCP, using its management and exchange protocol over the unifying mesh waveform, may continuously share this socket database with other OCP elements. In this manner, OCP elements may share information regarding the dynamic socket waveform connections in operation.

However, socket waveforms may often have interference ranges longer than the link-closure range of the unifying mesh waveform. In this case, rather than proactively relaying information describing RF spectral utilization in a proactive manner similar to the Unifying Slot Assignment Protocol (USAP), OCP may obtain this information in a reactive manner. OCP queries may be multicasted to OCP elements operating within the interference range of the proposed dynamic socket waveform containing a description of the proposed change in RF usage. This query may be accomplished via a pruned broadcast, repeated single cast to OCP elements known to be operating within that area, or with a geographic routing protocol such as the Geographically-Directed Multicast Protocol. Replies to the query may contain a description of conflicting spectral usage. If any conflicts are found, these may be added to the requestor's database and an updated proposed set of changes proposed. The negotiation may iterate until a non-conflicting set of changes is found or a contradiction is reached. Further work may be progressing to allow for proposed changes, which may require changes beyond the interference range of the proposed changes.

Figure 3:
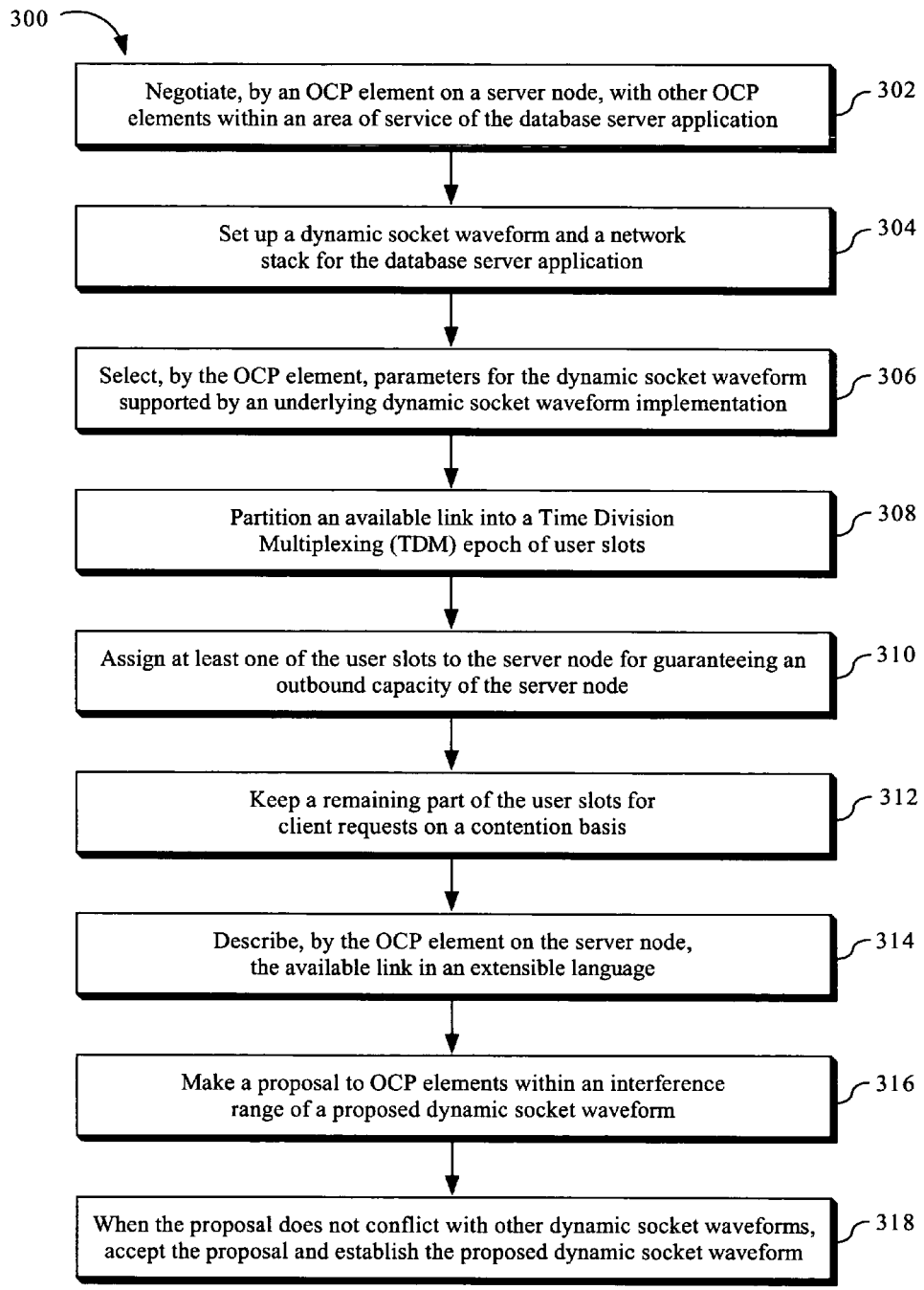
FIG. 3 is a flowchart of a method for an Organization and Control Proxy (OCP) to enable configuration of a dynamic socket waveform for a User Datagram Protocol (UDP)/Internet Protocol (IP)-based database server application in accordance with an exemplary embodiment of the present invention.

FIG. 3 shows a method 300 for an OCP to enable configuration of a dynamic socket waveform for a User Datagram Protocol (UDP)/Internet Protocol (IP)-based database server application. The server may be desired to have a dedicated portion of outbound data capacity for disseminating the results of queries. In this example, suppose 80 kbps (kilobits per second), including transport and network layer overhead, is required. Further, it may be expected that requests to the server are of a relatively smaller data capacity requirement and that requests by clients including a 1000-bit message may occur in an asynchronous fashion. A TDMA (time division multiple access) data link may be appropriate if one imposes the requirement upon the client media access layer that requests for service be delayed until slots are scheduled.

An OCP element on a server node may negotiate with other OCP elements within an area of service of the database server application 302. A dynamic socket waveform and a network stack may be set up for the database server application 304. The OCP element may select parameters for the dynamic socket waveform, including channel coding, TRANSEC parameters, modulation, bandwidth, transmitter power, and the like, supported by the underlying dynamic socket waveform implementation 306. An available link may be partitioned into a Time Division Multiplexing (TDM) epoch of user slots 308. At least one of the user slots may be assigned to the server node for guaranteeing an outbound capacity of the server node 310. The remaining part of the user slots may be kept for client requests on a contention basis 312. Supposing that 10% overhead is required for maintenance of timing and slot scheduling, start/stop, propagation time, and the like of the dynamic socket waveform, OCP may partition the available link into a Time Division Multiplexing (TDM) epoch of nine user slots, e.g., each of 100 ms in duration and the epoch of one second in duration. The user slots are then capable of carrying 10 kbits of user data. The server is then to be assigned eight of the nine user slots guaranteeing its 80 kbps outbound capacity, and the remaining slot is for client requests on a contention basis. The requests may even be transmitted at a random time within the contention slot.

Figure 4:
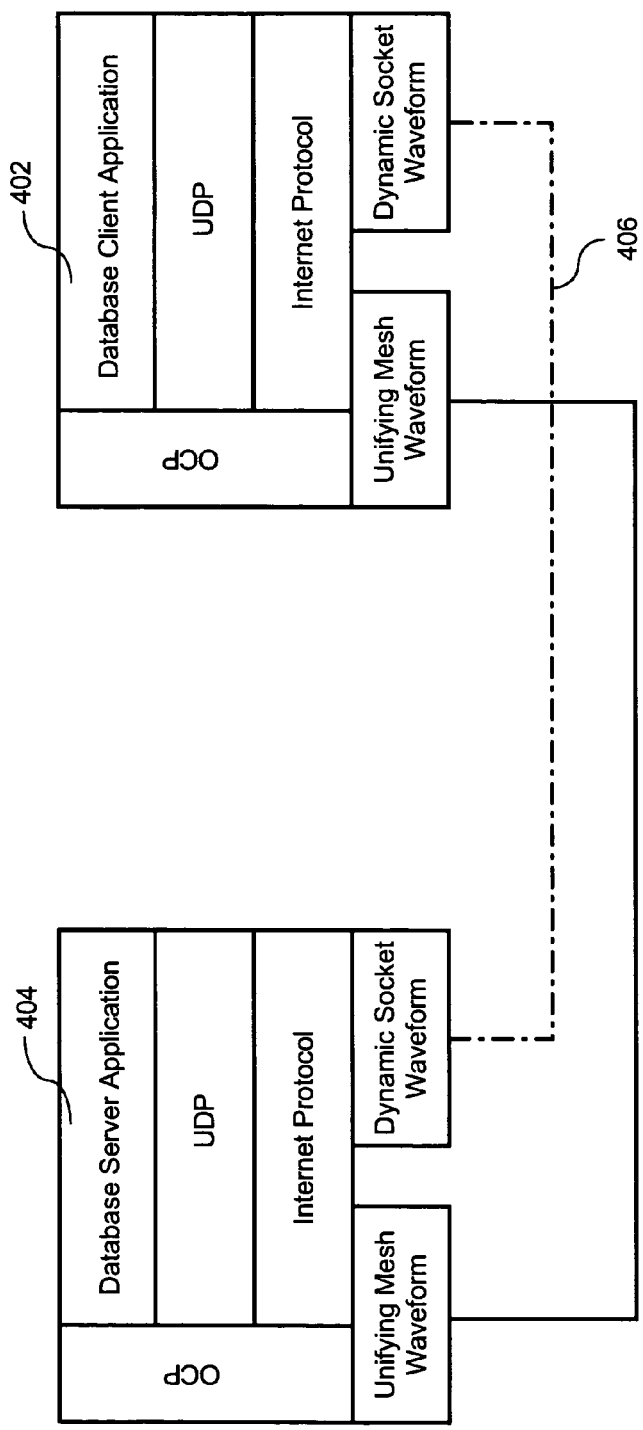
FIG. 4 is a schematic diagram illustrating that the client and server applications begin communicating via the established communications services in accordance with an exemplary embodiment of the present invention.

The OCP element on the server application's node may describe this link in an extensible language 314, and make a proposal to the OCP elements within the interference range of the proposed dynamic socket waveform 316. Assuming that the proposal does not conflict with other dynamic socket waveforms, the proposal may be accepted and the dynamic socket waveform may be established 318. FIG. 4 illustrates this example, where the client applications 402 and the server applications 404 are shown to communicate via the established communications services 406.

If network plans for legacy networks are translated to an extensible language and available to OCP, the OCP may configure the terminal to act as a part of that legacy network. Potential also exists for integration of OCP with Classical IP over ATM (CLIP) for providing data convergence to applications or for crossing-banding or inter-networking of data between waveforms.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magneto-optical disk, ROM, RAM, EPROM, EEPROM, magnetic or optical card, or any other suitable media for storing electronic instructions.

It is understood that the specific order or hierarchy of steps in the processes disclosed is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for using an Organization and Control Proxy (OCP) to configure a network communications infrastructure, comprising:
   distributing OCP functionality across nodes possessing OCP elements;
   intercommunicating, via a unifying mesh waveform, between said OCP elements for network discovery, propagation of network and radio-frequency (RF) socket usage information, and management and control of instances of dynamic socket waveforms, said dynamic socket waveforms providing parameters describing point-to-point communications protocols, multi-point communications protocols, media access modes, TRANsmission SECurity (TRANSEC) characteristics and Signal In Space (SIS) parameters;
   using, by said OCP elements, an extensible language for specification of waveform properties to negotiate spectral use information and to negotiate configurations between two or more endpoints of a dynamic socket waveform connection; and
   configuring, by said OCP, a network stack to provide requested service to an end user.

2. The method of claim 1, wherein said unifying mesh waveform is Wideband Networking Waveform (WNW).

3. The method of claim 1, wherein said unifying mesh waveform is Tactical Targeting Network Technology (TTNT) waveform.

4. The method of claim 1, wherein said unifying mesh waveform is Tactical Targeting Network Technology Small Form Factor (TTNT SFF) waveform.

5. The method of claim 1, wherein said network stack is configured as a chain of protocol elements built up from media access and physical layers.

6. The method of claim 5, wherein said network stack includes at least one of sub-networking protocol, inter-networking protocol, transport protocol, session protocol, or presentation protocol.

7. The method of claim 1, wherein said network stack is configured to include TCP PEP (performance enhancing proxy).

8. The method of claim 1, wherein each of said OCP elements is suitable for maintaining a model view of RF bands in which said each of said OCP elements is allowed to operate.

9. The method of claim 8, wherein usage allocations corresponding to existing dynamic socket waveform connections within said RF bands are expressed as a tuple including a frequency coverage, multiple access scheme, modulation, and power and geographic coverage in terms of link closure and interference.

10. The method of claim 9, wherein said OCP elements share information regarding dynamic socket waveform connections in operation.

11. The method of claim 9, wherein when socket waveforms have interference ranges longer than a link closure range of said unifying mesh waveform, said OCP obtains information describing RF spectral utilization in a reactive manner.

12. A method for an Organization and Control Proxy (OCP) to enable configuration of a dynamic socket waveform for a User Datagram Protocol (UDP)/Internet Protocol (IP)-based database server application, said method comprising:
   negotiating, by an OCP element on a server node, with other OCP elements within an area of service of said database server application;
   setting up a dynamic socket waveform and a network stack for said database server application;
   selecting, by said OCP element, parameters for said dynamic socket waveform supported by an underlying dynamic socket waveform implementation;
   partitioning an available link into a Time Division Multiplexing (TDM) epoch of user slots;
   describing, by said OCP element on said server node, said available link in an extensible language;
   making a proposal to OCP elements within an interference range of a proposed dynamic socket waveform; and
   when said proposal does not conflict with other dynamic socket waveforms, accepting said proposal and establishing said proposed dynamic socket waveform.

13. The method of claim 12, wherein said parameters include at least one of channel coding, TRANsmission SECurity (TRANSEC) parameters, modulation, bandwidth, or transmitter power.

14. The method of claim 12, further comprising:
   assigning at least one of said user slots to said server node for guaranteeing an outbound capacity of said server node; and
   keeping a remaining part of said user slots for client requests on a contention basis.

15. A non-transitory computer-readable medium having computer-executable instructions for performing a method for an Organization and Control Proxy (OCP) to enable configuration of a dynamic socket waveform for a User Datagram Protocol (UDP)/Internet Protocol (IP)-based database server application, said method comprising:
   negotiating, by an OCP element on a server node, with other OCP elements within an area of service of said database server application;
   setting up a dynamic socket waveform and a network stack for said database server application;
   selecting, by said OCP element, parameters for said dynamic socket waveform supported by an underlying dynamic socket waveform implementation;
   partitioning an available link into a Time Division Multiplexing (TDM) epoch of user slots;
   assigning some of said user slots to said server node for guaranteeing an outbound capacity of said server node;
   keeping a remaining part of said user slots for client requests on a contention basis;
   describing, by said OCP element on said server node, said available link in an extensible language;
   making a proposal to OCP elements within an interference range of a proposed dynamic socket waveform; and
   when said proposal does not conflict with other dynamic socket waveforms, accepting said proposal and establishing said proposed dynamic socket waveform.

* * * * *